Patented Mar. 7, 1944

2,343,359

UNITED STATES PATENT OFFICE 2,343,359

SPRAY MATERIAL AND METHOD OF MAKING THE SAME

Robert B. Arnold, Stonewall Courts, Va., assignor to Tobacco By-Products and Chemical Corporation, Louisville, Ky., a corporation of Delaware No Drawing. Application July 17, 1940, Serial No. 345,985

11 Claims. (Cl. 167—33)

This invention relates to spray materials and to a process of making the same.

The principal object of the present invention is to provide a dry, concentrated, spray material for use in making a combination spray, utilizing the parasiticidal properties of an alkaloid selected from the group nicotine, nornicotine, anabasine, which spray material will permanently carry a higher concentration of alkaloid than has heretofore been attained in a combination spray material, the alkaloid being in such forms that the spray made from such spray material may have not only a strong contact action, due to a high percentage of a portion of the alkaloid which is water-soluble, but also a strong action as a stomach poison, due to a high percentage of a portion of the alkaloid which is water-insoluble and durable, while at the same time the said spray material is very readily and quickly wetted by and finely dispersed in water, yet is so durable that it may be stored and shipped in ordinary, that is to say, non-hermetically sealed containers, without loss of alkaloid due to decomposition or oxidation even when kept for a relatively long time.

A further object of the invention is to provide a spray material having the characteristics above described which will be compatible with the usual fungicide sprays of the non-alkaline sulphur and copper types and with the so-called summer oil insecticidal sprays. In fact, the spray material of the present invention is compatible with any other spray material that does not give an appreciable alkaline reaction in the water of the spray tank.

By the provision of a dry concentrated parasiticidal spray material of the type described, the cost of packaging, shipping and storing the material is greatly reduced, which becomes particularly important at the present time due to the general long distance transportation of such spray materials, including transportation to foreign countries.

With the above objects in view a product embodying the invention, broadly considered, comprises an alkaloidal insecticidal material selected from the group consisting of nicotine, nornicotine, anabasine, part of which alkaloid is chemically combined with a comminuted, solid base-exchange material to form an insoluble non-volatile insecticide, and the remainder of which alkaloid, constituting an essential portion of the whole amount of alkaloid, is combined with an acid to form a water-soluble salt, this water-soluble salt being carried and retained by a suitable solid carrier, and being either a strong mono-basic inorganic acid salt of said alkaloid, which salts firmly retain the acid against volatilization, or a poly-basic acid salt of such an alkaloid, from which a part of the alkaloid is readily volatilized, associated with a volatilization preventer to form a non-volatile but water-soluble compound of the alkaloid.

In one embodiment of the invention, the only carrier of the soluble alkaloid salt is the same material, namely, the solid base-exchange material, which holds some of the alkaloid in chemical combination.

In another embodiment of the invention, the chemically combined alkaloid is carried by a solid base-exchange material, as hereinbefore referred to, while the excess alkaloid in water-soluble salt form is carried, in part, by said base-exchange material and in part by another material not capable of chemically combining with the alkaloid or at least not to any appreciable extent, so that it may be termed chemically inert to the alkaloid, but having good adsorptive powers for adsorbing the particular alkaloid used with it, this chemically inert material which carries excess alkaloid being intimately compounded with the solid base-exchange material which has the alkaloid in chemical combination. The said other chemically inert material may be a clay of such a type that it will not react chemically with the alkaloid salt, or at least to a lesser extent than does the base-exchange material.

With this particular mixture of solid base-exchange material and special clay, the same alkaloid is employed, both to produce the chemical combination with the base-exchange material and to provide the excess salt to be adsorbed by it and by the clay. If the alkaloid salt be non-volatile, the desired product will be obtained directly. However, it has been found that a more generally applicable insecticide will be obtained if a partly volatile salt of the alkaloid, that is to say, a salt of a poly-basic acid be used, in which case there is employed a component for preventing escape of nicotine from the spray composition. This may be termed a fixing component and must be distinguished from a mere retarder which is intended to insure a slow delivery of nicotine on the plant. This fixing component mingles not only with the part of the excess salt of the alkaloid on the clay but also with that part carried by the base-exchange material having alkaloid in chemical combination, thereby avoiding any possibility of evolution of volatile alkaloid, and at the same time providing a substantially dry product which can be readily handled and packaged.

The invention also includes a process of making the insecticidal spray material, which process, generally considered, comprises, as a most essential feature, contacting a base-exchange material having the capacity of entering into a base-exchange reaction with a salt of an insecticidal alkaloid of the type hereinbefore set forth, with such a salt of the alkaloid, in the presence of a restricted amount of water, the proportion of the alkaloid salt being always considerably in excess of the amount necessary to supply the alkaloid which enters into base-exchange reaction with the base-exchange material, whereby an excess of the alkaloid salt unacted upon by the base-exchange material is provided.

It will be understood from the description of the product hereinabove given, that when a poly-basic acid salt of the alkaloid is used, the process further includes the step of adding and thoroughly incorporating a small proportion of a fixing component which will substantially inhibit the volatilization with time of that part of the alkaloid contained in the excess of alkaloid salt which normally volatilizes. This makes it possible to store and ship the final product without any or any appreciable loss of insecticidal value.

While several types of solid base-exchange materials are suitable for use in producing a dry, insoluble salt of the hereinbefore mentioned alkaloids, it has been found that certain solid, inorganic base-exchange materials which are complex polysilicates have the great advantage that they quickly react with the alkaloids named to form a stable, complex polysilicate of the alkaloid, and furthermore such complex polysilicates are low in cost and readily obtained in large quantities.

Hence, in the description hereinafter, reference will be made only to the complex polysilicates having base-exchange properties, it being understood, however, that other base-exchange material may be employed.

In one form of the invention a complex polysilicate having the required base-exchange properties is used as the only carrier of the excess alkaloid salt of a poly-basic acid and of the fixing agent, so that after incorporation of the alkaloid salt, the very restricted amount of water, and the small percentage of fixing agent, the resulting product is then subjected to heat at least sufficient to dry it; is ground and graded and the finer material is ready for packaging and shipment to the consumer.

In another form of the invention, there is mixed with a complex polysilicate an additional finely comminuted carrier which may be termed substantially inert to the alkaloid salt and serves chiefly as an adsorbent to hold at least a large part of the excess alkaloid salt. In this case, if poly-basic acid salt is used with a fixing agent, the latter unites with that part of the excess alkaloid salt carried by the inert carrier, as well as with that part of said excess salt carried by the complex polysilicate itself. The resulting product of this modified process is also subjected to heat to dry it; is ground and graded and the finer product is then ready for storage and shipment as a spray material.

The complex polysilicate which has base-exchange properties and which is particularly suitable for carrying out the present invention may be found in the general class of raw materials known as bentonites, which class, however, includes some materials not so satisfactory for applicant's purpose. It has been found that certain Wyoming bentonites known on the market as Volclay or Wilkinite and some California bentonites known as Filtrol and "Stay-up" are excellent for carrying out the present invention. These satisfactory bentonites may be classified as complex poly-alumino-silicates having base-exchange properties. (Sometimes the aluminum is replaced in part by iron in trivalent form.)

Such silicates hold in combination divalent and monovalent metals, for example, calcium, magnesium, sodium and sometimes potassium, and in general the alkaloid replaces part of such divalent or monovalent metals in the base-exchange reaction and thereby enters into chemical combination with the poly-alumino- (or ferro- or alumino-ferro) silicate.

When using the best types of complex polysilicates above mentioned, to form a chemical combination with the alkaloid selected, it will be found that the resultant product gives a durable alkaloid combination from which the chemically combined alkaloid will not be dissolved out by water, nor will the alkaloid, such as nicotine, nornicotine, or anabasine readily escape from the combination by volatilization. In other words, the alkaloid may be said to be fixed.

The said complex poly-alumino-, ferro-, or alumino-ferro silicates also have relatively strong adsorptive power and in the present invention advantage is taken of this power, as will be clear hereinafter.

While any suitable salt of an alkaloid selected from the group nicotine, nornicotine or anabasine, may be employed, in usual practice the nicotine salts are employed, and of these, nicotine sulphate is more readily available but being the salt of a dibasic acid, a part of its alkaloid may be set free easily and hence may be said to be volatile in part. As a non-volatile nicotine salt, nicotine-zinc-hydrochloride has been found to be suitable, but only for certain purposes, where the plant to be sprayed will not be injured by the zinc.

For the purpose of preventing the release of nicotine from the spray composition applicant has found that a small percentage of tannic acid, far less than would be sufficient to combine with all the volatilizable portion of the nicotine in the water-soluble salt, will serve as a fixing component if thoroughly commingled with the water-soluble salt during the manufacture of the spray material. In general, the percentage of tannic acid may vary from 5% to 10% of the whole material.

Applicant has discovered that another very advantageous fixing component is the dust made from flue-cured tobacco. Such a tobacco dust is acid but its acidity is that due to an organic acid weaker than the acid of the water-soluble nicotine salt and hence is unable to act chemically thereon. It is not possible to use an alkaline tobacco dust as that will combine with the acid of the water-soluble salt and set free a proportional amount of nicotine. A tobacco dust which is truly neutral and will remain so, may be used, but in practice it is safer to use the flue-cured tobacco dust as that has and retains a pronounced acidity. Such a dust should be used in such proportion that it will form from about 20% to about 40% of the mixture.

The percentage of moisture present in the said tobacco dust must be determined and if more than 10%, the dust should be subjected to a drying operation.

It has been found that the tobacco dust, neutral or acid, has the additional advantage that it aids in carrying out the process, by acting in part as an adsorbent of some of the water-soluble nicotine salt and at the same time tends to overcome or at least reduce caking of the complex polysilicate salt of nicotine during the drying operation.

Applicant has further discovered that certain mineral lubricating oils which have a boiling point of above about 700° F. and a viscosity of between 180 and 900 seconds Saybolt at 100° F. are particularly suitable as a fixing component if care is taken to use only a small proportion of such oil, most advantageously about 5%, and in no case less than about 2% or more than 8%. Red engine oil has been used with success.

If too much is used the spray composition will not be wetted well by the water when mixed in the spray tank. It has been found that 5% of the said oil does not injuriously affect the wetting properties of the spray composition, and such an oil has the additional advantage that, with a complex polysilicate salt of nicotine, it serves as a sticker, that is, it increases the adhesion of the said salt to the leaves of the sprayed plant, so that the latter is not so easily washed off the plant by rain. When used with the complex polysilicate it is readily adsorbed and absorbed by the latter, so that the resultant spray material is less likely to cake in the drier, the dried product is more easily ground to fine dust and caking during storage and transit in avoided. At the same time there is no chance of leakage of oil from the spray composition. The latter, when containing said mineral lubricating oil as a fixing component has a velvety feel.

Another fixing component which may be used is oleic acid and this is to be used in about the same proportions as the mineral lubricating oil hereinbefore discussed, viz: from 2 to 8 percent.

In that modification of the invention in which there is added a so-called inert carrier to carry by adsorption some of the excess alkaloid salt, it has been found advantageous to employ as a carrier certain selected clays which will have no, or but little, chemical reaction with the alkaloid salt employed. Some clays, such as pure kaolin, have some appreciable base-exchange properties and, hence, when using pure kaolin, allowance should be made for the increase in fixed alkaloid due to the use of such kaolin. Other clays which are not so pure as kaolin have little or no base-exchange action and are very satisfactory for applicant's process. Hence, it is well in selecting a commercial clay for use as an inert carrier to make a proper test of the clay in advance of its use. In this form of the invention, by properly proportioning the amount of inert carrier, such as clay, to the amount of the complex polysilicate base-exchange material, the ratio of fixed alkaloid to soluble alkaloid may be correspondingly adjusted. In practice it has been found that certain clays on the market known as Bancroft clay and "Inert C" from Georgia are entirely satisfactory for applicant's purpose.

Some specific examples of the invention will now be set forth:

*Example I*

A suitable bentonite having the required characteristics hereinbefore pointed out is suitably comminuted and graded, as by sifting, to remove all particles which will not pass a screen of 100 mesh. To the powdered material, which may contain as much as 7% moisture, nicotine sulphate of 40% nicotine strength and containing about 40% water is added in considerable excess, and also there is added a lubricating oil having a viscosity at 100° F. of between 190 and 900 seconds Saybolt, the oil not to be less than 2% and not to exceed about 5% or 6% of the total dry weight of all the material. The lubricating oil known as Red engine oil has been found very suitable. After thoroughly mixing the materials, as by vigorous stirring for 10 or 15 minutes in a suitable paddle mixer, the resultant product is not a wet slurry but only a slightly damp, finely comminuted material, readily handled by conveyors or chutes. This product is passed into a dryer kept at a temperature of about 180 to 220° F. and retained in such dryer until substantially all the free moisture contained in the bentonite and in the nicotine sulphate has been driven off. In usual practice a rotary steam dryer is employed, the length and slope being such that the product discharged is dry. The resultant product is then ground and graded, as by air-separation or sifting so as to obtain a fine product, which constitutes the desired spray material. The relative proportions by weight of the materials at the beginning and at the end of the process are as follows:

|  | Wet | Dry |
| --- | --- | --- |
|  | *Pounds* | *Pounds* |
| Special bentonite, 7% moisture | 78 | 73 |
| Nicotine sulphate, 40% moisture (40% nicotine) | 37 | 22 |
| Lubricating oil (Red engine oil) | 5 | 5 |
|  | 120 | 100 |

It will be seen that the water present in the raw mix is about 16%. The finished spray material will contain about 14.8% nicotine, of which about 50% is chemically combined with the bentonite and the remainder is in the form of nicotine sulphate which, with the lubricating oil as a fixing component, is adsorbed by the nicotine-bentonite salt. As the excess nicotine sulphate loses its water during the drying operation, it gradually passes into the form of a jelly, adheres to and is adsorbed by the particles of nicotine-bentonite powder, and assists in holding the small percentage of lubricating oil. The spray material in its finished form is a finely comminuted dry product, with a velvety feel due to the presence of the slight amount of oil. It can be readily poured into suitable packages which need not be hermetically sealed, and may be kept for many months without appreciable loss of nicotine strength. In practice, double wall paper bags have been entirely satisfactory.

When it is to be used as a spray, it may be mixed with water in the usual spray tank in such proportions as are necessary to give the required strength of nicotine in the spray, usually about 3 lbs. to 100 gallons of water. Owing to the presence of the limited amount of mineral oil, the spray material does not cake in storage, and is wetted quickly enough for practical purposes when stirred with water in the spray tank where it will be rapidly dispersed in fine particles. This is not the case if too high a percentage of oil is used. It is possible that one reason for this rapid dispersion is due to the fact that the oil has a certain flotative power, but whether this be the true explanation or not, it is a fact that the dispersion of the spray material in very finely divided particles occurs with great rapidity. When applied to a plant, about one-half the nicotine in the spray is present in solution, to serve as a contact poison, and this will kill many sucking insects with which it makes contact, and also will act as a stomach poison until washed away by rain, while the remainder of the nicotine which is in chemical combination with the bentonite will remain on the plant even after considerable rain, and while on the plant will act as a stomach poison to kill chewing insects.

In normal practice such a combination spray is desirable because one application of spray destroys the sucking insects and leaves a residue to protect the plant for a time against chewing insects which may then be there or come somewhat later while the spray deposit remains on the plant.

Example II

This is an example of that modification of the invention in which an inert carrier is compounded with the special bentonite, the inert carrier being a clay which has little or no base-exchange properties such as would cause a reaction with an alkaloid salt of the type employed in carrying out the invention, but has good adsorptive properties. By the use of such an inert or substantially inert carrier intimately mixed with the polysilicate, it becomes possible to make an adjustment of the relative proportions of soluble and fixed nicotine in the spray material and therefore in the spray finally produced therefrom by the user.

A clay of the type hereinbefore discussed is added to the special bentonite, such as has been described hereinbefore, the two thoroughly comminuted, admixed, as by grinding in a suitable mill, and graded as by sifting in the same way as in Example I, so that the mixture is powdered and will all pass a screen of 100 mesh, or if desired, even a finer mesh. To the powdered material there is added the alkaloid salt and the oil, and further mixing of the materials is carried out, whereupon the resulting product is run through a dryer to remove substantially all moisture; is ground and graded and then the finer material is packaged as desired for storage and shipment. The composition of the starting materials and of the finished product is as follows:

|  | Wet | Dry |
| --- | --- | --- |
|  | Pounds | Pounds |
| Special bentonite 7% moisture | 50 | 46.5 |
| Clay (Bancroft) 7% moisture | 28 | 26.5 |
| 40% nicotine sulphate 40% moisture | 37 | 22 |
| Lubricating oil | 5 | 5 |
|  | 120 | 100 |

In the original mix the water is about 16%. In this spray material there will be about 35% of the nicotine fixed, that is, chemically combined and about 65% soluble nicotine.

The percentage of nicotine in the finished product is about 14.8%, but because of the use of the inert carrier the relative proportions of fixed and soluble nicotine have been changed from the proportions in Example I. By adjusting the proportions of the clay with relation to the bentonite, the proportions of the fixed nicotine to the soluble nicotine may be correspondingly adjusted, so that a spray material having a desired ratio of fixed to soluble nicotine may be obtained, within certain limits.

Of course, notwithstanding the addition of the inert carrier, which is depended upon principally for its adsorptive properties and not for its base-exchange properties, the complex polysilicate still adsorbs its share of the excess alkaloid salt, but because there is less of the base-exchange complex polysilicate, relatively, in a given weight of spray material than when it is used alone there will be a reduced percentage of insoluble alkaloid salt and a greater percentage of water-soluble alkaloid salt in the final product.

In making a spray from the above spray material it is added to the water in the tank in the proportion of about three or four pounds per 100 gallons.

Example III

In this example the fixing component is finely ground stems of flue-cured, and therefore acid, tobacco.

The composition of the starting materials and of the finished product are as follows:

|  | Wet | Dry |
| --- | --- | --- |
|  | Pounds | Pounds |
| Special bentonite 7% moisture | 150 | 140 |
| Flue-cured tobacco dust 6% moisture | 50 | 47 |
| 40% nicotine sulphate 40% moisture | 100 | 60 |
|  | 300 | 247 |

The tobacco dust usually contains about 0.6% nicotine so that the amount of nicotine in the above product, finished, is about 40.3 lbs., or nearly 16.3%. Of this amount the insoluble complex polysilicate of nicotine holds about 16 lbs. and the water-soluble salt of nicotine holds about 24.3 lbs. This gives a ratio of about 40% stomach poison and about 60% contact poison, disregarding the nicotine in the tobacco dust itself which will increase contact poison to a considerable extent.

The amount of water present during the reaction is about 17 or 18% and in this case also the product before it enters the dryer is merely damp and easily conveyed to and through the dryer. The tobacco dust not only serves as a fixing component of the finished product, but also as a filler to reduce caking during the drying operation. The tobacco dust also carries a portion of the water-soluble salt by adsorption or absorption, or both.

In using this composition to make a spray it is added to the water in the spray tank in the proportion of about three or four pounds to 100 gallons of water.

Example IV

It is often desirable to provide a spray material which can be used to form an aqueous spray relatively high in contact poison. The following composition has been found to be excellent:

|  | Wet | Dry |
| --- | --- | --- |
|  | Pounds | Pounds |
| Special bentonite 7% moisture | 100 | 93 |
| Bancroft clay 6% moisture | 50 | 47 |
| Flue-cured tobacco dust 6% moisture | 50 | 47 |
| 40% nicotine sulphate 40% moisture | 100 | 60 |
| Light engine oil | 13 | 13 |
|  | 313 | 260 |

The water present during the reaction is about 16%. The dry product contains about 15% nicotine, about two-thirds of which is soluble and one-third insoluble.

The composition is used in the proportions of about three to four pounds per 100 gallons of water.

*Example V*

A composition in which tannic acid is used as a fixing component may be made as follows:

|  | Wet | Dry |
|---|---|---|
|  | Pounds | Pounds |
| Special bentonite 7% moisture | 107 | 100 |
| 40% nicotine sulphate 40% moisture | 45 | 27 |
| Tannic acid, dry | 8 | 8 |
|  | 160 | 135 |

In this the moisture is about 16%. The nicotine strength of the spray composition is about 13⅓%, of which about 65% is insoluble and 35% water-soluble.

The steps of procedure in making this composition are substantially the same as were described in connection with the prior examples.

In using this composition about three or four pounds may be employed per 100 gallons of water.

*Example VI*

It is possible to make a durable combination spray composition in which no fixing component is necessary. In such case the water-soluble nicotine salt should be a salt of a strong monobasic inorganic acid.

While nicotine hydrochloride might be used, in place of nicotine sulphate, with a base exchange material, the said nicotine salt being in such proportions as to provide the necessary excess of nicotine over that amount which will react with the base-exchange material, there are certain difficulties which arise with said nicotine chloride, first, because it is highly hygroscopic and, second, because in general it may have a slight injurious effect on many plants, noticeable if repeated sprays are used. Therefore, to avoid the hygroscopic effect it is well to use the salt known as nicotine-zinc-hydrochloride, which is very permanent. This salt is crystalline and may be said to be dry. The said salt usually contains about 47% nicotine, which is non-volatile.

The composition of the mix and of the finished product may be as follows:

|  | Wet | Dry |
|---|---|---|
|  | Pounds | Pounds |
| Special bentonite, 7% moisture | 107 | 100 |
| Nicotine-zinc-hydrochloride | 30 | 30 |
| Water added | 20 | 0 |
|  | 157 | 130 |

The mixture must be very thoroughly stirred for sufficient time to insure the reaction of the nicotine with the polysilicate to satisfy the base-exchange properties of the polysilicate. Usually about 20 minutes are required.

Notwithstanding the addition of water, the total water present is only about 17%, so the resultant product when ready for the dryer is merely a moist solid material and not a slurry.

It is to be noted that the nicotine-zinc-hydrochloride is used in such proportion that there will be about eight pounds of nicotine to satisfy the base-exchange properties of about 100 pounds of bentonite, and, in the example given, an excess of the said water-soluble salt carrying about six pounds of nicotine which during the drying operation is dried to form the adsorbed dry water-soluble salt carried by the insoluble complex polysilicate of nicotine.

Owing to the cost of the nicotine-zinc-hydrochloride the spray material containing it is only used in special cases, where only one or two spray treatments are required, but as it is very durable and exceedingly effective against some insects, it has a place in the art.

It may be used in the proportion of about three or four pounds to 100 gallons of water.

By using a greater proportion of the nicotine-zinc-hydrochloride than that given in the formula above, a very highly concentrated spray material may be obtained and this is one of the principal advantages of the said salt.

Also, when making the aqueous spray, soda ash may be added to the extent of about 10 to 12% of the spray composition, by weight. This tends to reduce any danger of injury to the plants.

No special example of a spray composition using oleic acid as a fixing component is given since it may replace any of the other fixing components if used in the same manner and proportions as the special lubricating oils hereinbefore described.

It will be seen that the new process necessitates the use of the water-soluble nicotine salt in much excess, a limitation as to the proportion of water, and, when a di-basic acid is employed, the addition of a fixing component.

Also it will be noted that each product comprises a finely comminuted water-insoluble salt of the stated alkaloid surcharged with an adherent dry water-soluble product carrying the same type of alkaloid in non-volatile form. In the spray material made from a strong monobasic inorganic acid, the said adherent dry product may be merely the water-soluble mono-basic acid salt of the alkaloid, holding the alkaloid in non-volatile form. In the spray material made by the use of a di-basic acid, the adherent dry product comprises not only the water-soluble salt of the stated alkaloid, but in addition a fixing component.

It is to be understood, however, that, even when using the mono-basic acid salt, the addition of the described proportion of a fixing component is not excluded and may be advantageous. This is particularly the case with oil in the small proportions hereinbefore stated because the advantageous properties of the oil aside from its fixing action, such as reducing caking of the spray material and improving the sticking of the spray products to the plant, make the use of the said oil in its restricted proportions, of considerable value.

In usual practice it is customary to add to the water in the spray tank a spreader material. This can be done when using the spray material of the present invention, it being understood however that such spreader should be one which has no injurious reaction on the said spray material. It has been found that there is a spreader consisting of a sulphate of lauryl alcohol, sold on the market under the trade name of Orvus which is particularly suitable for use with the spray materials of the present invention, and since it is a dry product it may be added to the spray material at the factory in the proper proportion, which is usually about one-fourth to one per cent by weight of the total spray material. It has been found that good results are attained with 7½ lbs. per ton, or about three-eighths of one per cent.

It is to be understood that the term "fixing component," as used in the claims designates a material selected from the following list of ingredients in the range of proportions and with the characteristics hereinbefore stated, namely, (1) tannic acid, (2) flue cured tobacco dust, (3) mineral lubricating oil, (4) oleic acid.

Also it is to be understood that the term "dry compound of water-soluble non-volatile alkaloid" used in the claims designates either a mono-basic acid salt of the relative alkaloid, which salt is itself non-volatile, or a poly-basic acid salt of the relative alkaloid accompanied by a fixing component, as defined above.

In applicant's Patent No. 2,311,629, dated Feb. 23, 1943, a different form of spray material using the reaction products of a base-exchange material and nicotine is disclosed but no claim is made in this application to such other spray material or to any process of making it.

What is claimed is:

1. The process of producing an insecticidal spray material, which comprises contacting, in the presence of a limited amount of water not exceeding 20 per cent and in the presence of a fixing component capable of maintaining the alkaloid in non-volatile form, a base-exchange material having adsorptive properties, with a water-soluble salt of an alkaloid, selected from the group consisting of nicotine, nornicotine, anabasine, said salt being provided in an amount sufficient to supply the alkaloid in substantial excess of that necessary to satisfy the base-exchange properties of the base-exchange material, and then heating the products thus obtained to insure the adsorption of the excess of alkaloid salt by the base-exchange material and to produce a substantially dry product carrying both chemically combined fixed alkaloid and uncombined soluble salt of the same alkaloid in non-volatile form.

2. The process of producing an insecticidal spray material which comprises mixing, in the presence of a limited amount of water not exceeding 20 per cent, a complex polysilicate having base-exchange and adsorptive properties, nicotine sulphate in a proportion containing nicotine in substantial excess of that necessary to satisfy the base-exchange properties of the polysilicate, and not to exceed six per cent of a mineral lubricating oil having a viscosity ranging between 190 and 900 seconds Saybolt at 100° F., and drying the resultant product.

3. The process of producing an insecticidal spray material, which comprises commingling a complex polysilicate having base-exchange and adsorptive properties, and a substantially inert carrier material having adsorptive properties, contacting the mixture thus obtained, in the presence of a limited amount of water, with a water-soluble product containing in non-volatilizable form an alkaloid selected from the group consisting of nicotine, nornicotine, anabasine, said product being provided in an amount sufficient to supply the alkaloid in substantial excess of that necessary to satisfy the base-exchange properties of the polysilicate, and then heating the products thus obtained to insure the adsorption of the excess of alkaloid by the polysilicate and to produce a substantially dry product carrying both chemically combined fixed alkaloid and uncombined water-soluble salt of the same alkaloid in non-volatile form.

4. An insecticidal material suitable for use in making aqueous insecticidal combination sprays, comprising essentially a dry, solid, comminuted base-exchange material in chemical combination with an alkaloid selected from the group consisting of nicotine, nornicotine, and anabasine, and constituting a water-insoluble salt of the alkaloid, said water-insoluble salt carrying an adsorbed adherent dry compound of water-soluble non-volatile alkaloid selected from said group, said adherent dry-compound being material selected from the group consisting of: (1) non-volatile mono-basic acid salts of the said alkaloid, (2) volatile polybasic acid salts of said alkaloid, associated with a fixing component, the proportion of said water-soluble non-volatile alkaloid in said compound being in appreciable ratio relative to the amount of alkaloid in the water-insoluble salt.

5. An insecticidal material suitable for use in making aqueous insecticidal combination sprays, comprising essentially a dry, solid, comminuted base-exchange material in chemical combination with an alkaloid selected from the group consisting of nicotine, nornicotine, and anabasine, and constituting a water-insoluble salt of the alkaloid, said water-insoluble salt carrying an adsorbed adherent dry product consisting of a water-soluble poly-basic acid salt of an alkaloid selected from the aforesaid group associated with a fixing component to prevent volatilization of the alkaloid from the said poly-basic acid salt, the amount of alkaloid in said poly-basic acid salt being in appreciable ratio to the alkaloid in the water-insoluble salt.

6. An insecticidal material suitable for use in making aqueous insecticidal combination sprays, comprising essentially a dry, solid, comminuted base-exchange material in chemical combination with an alkaloid selected from the group consisting of nicotine, nornicotine, and anabasine, and constituting a water-insoluble salt of the alkaloid, said water-insoluble salt carrying an adsorbed adherent dry product consisting of a non-volatile water-soluble mono-basic acid salt of an alkaloid selected from the aforesaid group.

7. An insecticidal material suitable for use in making aqueous insecticidal combination sprays, as claimed in claim 6 in which the non-volatile water-soluble mono-basic acid salt of the alkaloid is a nicotine hydrochloride salt.

8. An insecticidal material suitable for use in making aqueous insecticidal combination sprays, as claimed in claim 4, in which the fixing component is mineral lubricating oil having a boiling point above 700° C. and a viscosity of between 180 and 900 seconds Saybolt at 100° F., in a percentage ranging between 2% and 8% by weight of the insecticidal material.

9. An insecticidal material suitable for use in making aqueous combination sprays, as claimed in claim 4, in which the fixing component is flue-cured tobacco dust comprising between 20% and 40% by weight of the insecticidal material.

10. An insecticidal material suitable for use in making aqueous combination sprays as claimed in claim 4, in which the fixing component is tannic acid comprising between 5% and 10% of the insecticidal material.

11. The process of producing an insecticidal material suitable for use in making aqueous insecticidal combination sprays, which comprises contacting, in the presence of a limited amount of water, not exceeding 20 per cent, and in the presence of a fixing component, a mixture of comminuted solid base-exchange material having adsorptive properties, and a comminuted absorptive inert solid material, with a water-soluble polybasic acid salt of an alkaloid selected from the group consisting of nicotine, nornicotine, anabasine, said salt being provided in an amount sufficient to supply the alkaloid in substantial excess of that necessary to satisfy the base-exchange properties of the base-exchange material, and then heating the product thus obtained to insure the adsorption of the excess of alkaloid by the base-exchange material and by the inert absorptive material, and to produce a substantially dry product carrying both chemically combined fixed alkaloid and uncombined soluble salt of the alkaloid in non-volatile form.

ROBERT B. ARNOLD.